Patented Feb. 6, 1951

2,540,651

UNITED STATES PATENT OFFICE 2,540,651

COMPOUNDING VULCANIZABLE ELASTOMERS EMPLOYING BITUMEN SOFTENERS AND RESULTANT VULCANIZATES

Theodore A. Bulifant, Hackensack, N. J., assignor to Allied Chemical & Dye Corporation, New York, N. Y., a corporation of New York No Drawing. Application July 15, 1948, Serial No. 38,943

12 Claims. (Cl. 260—28.5)

This invention relates to the compounding of natural and synthetic elastomers and more particularly to a novel softener for compounding natural and synthetic elastomers, to a process of compounding such elastomers involving the use of such softener and to the resultant vulcanates (products of vulcanization).

The addition of coal tar and water-gas tar pitches and other softeners, including asphalts, to elastomer mixes for the purpose of facilitating the incorporation therein of fillers and pigments, such as carbon black, clays, zinc oxide, iron oxide, etc., is conventional practice. Normal coal tar and water-gas tar pitch have variable but relatively high contents of components which are insoluble in benzol and it has generally been believed that the higher the content of these benzol-insoluble components, the better the strength and tensile characteristics of the vulcanizate. In fact, it has been proposed to use coal tar pitches having a benzol-insoluble content of 40% or more by weight to produce a softener particularly suitable for use in the compounding of rubber.

Such coal tar and water-gas tar pitch softeners have been found eminently satisfactory for use in the production of black vulcanizates. There is, however, a large industrial and consumer demand for vulcanized elastomers of light color, e. g., red, blue, green, orange, yellow, tan, or grey, in the manufacture of which such coal tar pitch and water-gas tar pitch softeners cannot be employed because they pigment the elastomer and impart to the vulcanizate a dirty-brown or brownish-black appearance. Asphaltic softeners which are wholly soluble in benzol, it has been found, are likewise objectionable in the production of such light-colored vulcanizates because of the tinting or discoloration effect they have on the vulcanizates.

It is an object of this invention to provide a softener for compounding light-colored elastomers which imparts desirable tensile and stress characteristics to the vulcanizate without objectionably discoloring it. Another object of this invention is to provide a process of compounding elastomers to produce light-colored vulcanizates employing a softener which does not deleteriously affect the color of the vulcanizate and imparts desirable tensile and stress characteristics thereto.

Still another object is to provide light-colored vulcanizates having improved tensile and stress characteristics.

Other objects and advantages of this invention will be apparent from the following detailed description thereof.

I have made the surprising discovery that by treating a coke-oven, water-gas or gas-house tar pitch with a selective solvent I can obtain bituminous materials which are soluble in benzol to the extent of 95% or more and therefore have less than 5% of benzol insolubles. These pitch-derived bitumens may vary from viscose liquids to hard, high melting solids and are characterized by low tinting power. In the preferred embodiments of this invention, the raw materials are selected and the processing so regulated as to give hydrocarbon products whose softening points fall within the range of from about 150° to 250° F. and still further preferably from 200° to 220° F. since in this range the products are sufficiently high melting to permit their being handled as free-flowing flakes and yet are easily combined with the elastomer on the mill. The softener thus produced is admirably suited for use in compounding light-colored elastomers, since it does not cause objectionable discoloration of the light-colored vulcanizates and imparts desirable tensile and stress characteristics thereto. The use of such substantially wholly soluble softener further results in vulcanizates having a materially higher tensile strength than is produced by compounding the same elastomer with a pitch having a relatively high content of benzol-insoluble components. This is indeed surprising in view of the belief generally held in the rubber compounding art that the higher the benzol-insoluble content of the softener, the higher the tensile strength of the resultant vulcanizates, other constituents and the conditions of carrying out the vulcanization being the same. Further, the stress characteristics of elastomers made with the softener of this invention are lower and elongations when subjected to a given stress higher, as compared with vulcanizates which differ only in that heretofore known softeners having relatively high benzol-insoluble contents are used instead of the softeners of this invention. Thus the compounds made by the process of this invention have materially greater elasticity and are therefore more satisfactory for use where high elasticity is desired.

The softener of this invention may be made by treating coke-oven tar pitch, gas-house tar pitch or water-gas tar pitch which, as produced, have relatively high benzol-insoluble contents usually in excess of 15%, and sometimes in excess of 20%, with a selective solvent to produce a tar-bitumen having less than 5% and preferably less than 3% of benzol-insoluble components. For example, a water-gas tar pitch containing, say 28% benzol-insolubles, is mixed with 2 to 4 volumes of a coal tar solvent, such as xylol or a crude coke-oven tar distillate boiling within the range of from 80° to 250° C. to precipitate an insoluble fraction which is removed by settling, filtering, or centrifuging. The solvent treatment, it has been found, does not alter the color of the pitch in mass, yet it surprisingly results in a product which no longer tends to discolor the elastomers with which it is admixed. The extract, from which the insoluble fraction has been removed, is distilled at a temperature not exceeding 300° C. under conditions which avoid the formation of benzol-insoluble components to drive off the solvent and light oils and produce a residue having a softening point within the range of from 150° to 250° F., preferably 200° to 220° F. The distillation may be carried out under vacuum, or at atmospheric pressure, or in the presence of steam to minimize formation of insoluble components and the resultant residue flaked to produce a solid flaked product which can be easily handled, particularly in that it is readily packaged for shipment and storage, does not cake on storage, and the required amount for any given elastomer mix may readily be poured from the package. Instead of water-gas tar pitch, coke-oven tar pitch or gas-house tar pitch may be treated as hereinabove described.

This tar-bitumen softener may be used advantageously in compounding light-colored stocks with any elastomer to facilitate the incorporation of fillers and/or pigments therein. For example, it may be used as the softener in the compounding of natural rubber, reclaimed rubber, butadiene-styrene copolymers (GR-S), butadiene-acrylonitrile copolymers, chloroprenes (neoprene), and copolymers of isobutylene and butadiene (butyl rubber). Natural or synthetic elastomers compounded with the improved softening agent of this invention may be formed by any of the usual or well known methods of compounding natural and synthetic elastomers. Any desired amount of softener of this invention may be incorporated in the elastomer mix. In general from 2 to 75 parts, preferably 5 to 40 parts, of softener are used per 100 parts of elastomer.

A softener derived from water-gas tar pitch and having a benzol-insoluble content of less than 5%, preferably less than 3%, is the preferred softener since it has been found that such softeners do not result in "blooming." Some, but not all, of the coal tar pitch derived softeners have a tendency to cause slight blooming to take place, but not to an extent rendering the coal tar pitch softeners unsatisfactory for use.

In addition to the softener of the invention, a pigment, depending on the color desired, filler, if desired, vulcanizing agent, preferably sulfur, a vulcanizing accelerator and a metallic oxide which activates the accelerator are mixed with the elastomer. The sulfur may be employed in proportions by weight of from 1 to 5 parts, preferably about 2 to 3 parts for each 100 parts of the elastomer. Any accelerator capable of accelerating vulcanization of the elastomer, either alone or in combination with an activating accelerator, may be utilized. Examples of accelerator types are: aldehydeamines, such as formaldehyde-aniline reaction products and butyraldehyde-aniline reaction products; guanidines, such as diphenylguanidine and diphenylguanidine oxalate; thiazoles, such as 2-mercaptobenzothiazole, mixed dimethyl and ethyl thiazyldisulfides, and benzothiazyl-2-monocyclohexyl sulfenamide; thiazolines, such as mercaptothiazoline; thiuram sulfides, such as tetramethylthiuram monosulfide and tetramethylthiuram disulfide; and dithiocarbamates, such as n-pentamethylene ammonium pentamethylenedithiocarbamate, and zinc dimethyldithiocarbamate. From 3 to 10 parts by weight of a metallic oxide capable of activating the accelerator, preferably about 3 to 5 parts of zinc oxide, should be incorporated for each 100 parts of the elastomer; other accelerator-activating metallic oxides are litharge and magnesium oxide. Suitable fillers are precipitated calcium carbonate, titanium dioxide, and clay, which provide a suitable base for producing or accentuating the desired color. Light-colored fillers should, of course, be used.

Dispersion of the softener and other compounding ingredients in the elastomer may be accomplished in various ways utilizing conventional equipment of the type employed for compounding natural or synthetic rubber, e. g., rubber mills of the roll type or internal mixers, such as the Banbury mixer.

The softener of this invention, it has been found, is a mild extender in that its use permits reduction in the amount of more expensive elastomers incorporated in the rubber mix without deleteriously affecting the properties of the vulcanizate.

To illustrate the advantages of the invention, the results of a series of tests conducted in accordance with standard and well known methods of the rubber industry are shown below. In the first series of tests a butadiene-styrene copolymer, and in the second series of tests natural rubber, was employed as the elastomer. In both series of tests the elastomer was mixed with the softener of this invention and also, for purposes of comparison, with the same quantity of a prior known softener and a comparison made of the physical characteristics of the resulting elastomers. The softeners embodying this invention were derived from coke-oven tar pitch. That used in the first series of tests had a softening point of 196° F. and a benzol-insoluble content of 0.6%. The softener used in the second series of tests had a softening point of 199° F. and a benzol-insoluble content of .89%. The comparative softeners were normal coal tar pitches; that employed in the first series of tests had a softening point of 213° F. and a benzol-insoluble content of 42.3% and that employed in the second series of tests had a softening point of 207° F. and a benzol-insoluble content of 43.6%.

*First series of tests*

The composition of the elastomer stocks was as follows (parts being by weight):

|  | Parts |
|---|---|
| Butadiene-styrene copolymer | 100 |
| Softener | 15 |
| Filler | 40 |
| Zinc oxide activator | 3 |
| Sulfur | 2 |
| Benzothiazyl sulfenamide | 1.2 |
| Total | 161.2 |

The compositions were milled and then a number of batches of each mix cured for 40 minutes, an additional number for 60 minutes, and still others for 80 minutes, all mixes being cured at 281° F. (35 pounds per square inch steam pressure). Results of tests on the cured elastomers were as follows:

| Elastomer Embodying this Invention | Tensile, p. s. i. | Stress to Effect 300% Elongation, p. s. i. | Stress to Effect 500% Elongation, p. s. i. | Elongation, Per cent |
|---|---|---|---|---|
| Cured 40 minutes | 2,600 | 300 | 700 | 860 |
| Cured 60 minutes | 3,000 | 450 | 1,050 | 750 |
| Cured 80 minutes | 3,000 | 550 | 1,250 | 710 |
| Comparative Elastomer | | | | |
| Cured 40 minutes | 2,400 | 800 | 1,700 | 600 |
| Cured 60 minutes | 2,400 | 850 | 1,900 | 560 |
| Cured 80 minutes | 2,600 | 900 | 2,000 | 550 |

Upon being subjected to an aging test for 48 hours in an air oven at 100° C., the stocks showed no significant deterioration.

Second series of tests

The composition of the elastomer stocks was as follows (parts being by weight):

|  | Parts |
|---|---|
| Natural rubber | 100 |
| Softener | 15 |
| Calcium carbonate (precipitated) | 50 |
| Titanium dioxide | 5 |
| Red iron oxide | 5 |
| Zinc oxide | 5 |
| Antioxidant (AgeRite Alba) | 1 |
| Stearic acid | 2 |
| Sulfur | 2.75 |
| Vulcanization accelerator (Zenite B) | 0.75 |
| Total | 186.50 |

The compositions were milled and then a number of batches of each mix were cured for 30 minutes at 281° F. (35 pounds per square inch steam pressure). Results of tests on the cured elastomers were as follows:

|  | Tensile, p. s. i. | Stress to Effect 300% Elongation, p. s. i. | Stress to Effect 500% Elongation, p. s. i. | Elongation, Per Cent |
|---|---|---|---|---|
| Elastomer Embodying this Invention | 3,050 | 450 | 1,300 | 720 |
| Comparative Elastomer | 2,950 | 550 | 1,600 | 680 |

Upon being subjected to an aging test in an air oven for 14 days at 70° C. the stocks showed no significant deterioration. In both the cured and uncured state the stocks containing the softener of this invention were characterized by a brick red color, whereas those containing the comparative softeners had a deep brown color.

The above data demonstrate that the use of the softener of this invention imparts substantially higher tensile strength to butadiene-styrene copolymers and natural rubber than do pitches of higher benzol-insoluble content and results in elastomers having lower stress and higher elongation characteristics, i. e., in a more elastic vulcanizate. Similar results occur when other synthetic vulcanizable elastomers are substituted for natural rubber or styrene-butadiene copolymers.

Superiority of the softener of this invention for use in producing light-colored elastomers, particularly from the standpoint of not imparting any objectionable tint or discoloration to the vulcanizate, is demonstrated by the tests described below. In these tests the same quantity of different softeners, hereinafter indicated, was employed, the recipe being otherwise unchanged. The recipe was as follows:

|  | Parts by weight |
|---|---|
| Butadiene-styrene copolymer | 100 |
| Calcium carbonate (precipitated) | 50 |
| Titanium dioxide | 5 |
| Red iron oxide | 5 |
| Softener | 15 |
| Total | 175 |

The mixes were milled on a rubber mill of the roll-type to produce a homogeneous mixture and the color of the resulting mixes observed.

The softeners employed in these tests were as follows:

1. *Softeners embodying this invention*

|  | Softening Point | Benzol-Insoluble Content |
|---|---|---|
|  | ° F. | Per cent |
| (a) Extracted bitumen from coke-oven tar pitch | 163 | 1.7 |
| (b) Extracted bitumen from coke-oven tar pitch | 196 | 0.6 |
| (c) Extracted bitumen from coke-oven tar pitch | 195 | 3.5 |
| (d) Extracted bitumen from water-gas tar pitch | 235 | 3.5 |

2. *Comparative softeners*

|  | Softening Point | Benzol-Insoluble Content |
|---|---|---|
|  | ° F. | Per cent |
| (a) Coke-oven tar pitch | 181 | 23.6 |
| (b) Coke-oven tar pitch | 153 | 8.9 |
| (c) Coke-oven tar pitch | 213 | 42.3 |
| (d) Water-gas tar pitch | 173 | 5.3 |
| (e) Water-gas tar pitch | 214 | 22 |
| (f) Asphalt | 300 | None |
| (g) Asphalt | 165 | None |

It was found that all the softeners of this invention did not objectionably tint or discolor the elastomer mix. On the other hand, softeners 2 (a) to 2 (g), inclusive, resulted in from dirty-brown to brownish-black mixes, in every case imparting objectionable discoloration.

Compositions in the same proportions noted in the above recipe containing the same softeners were respectively mixed with 5 parts zinc oxide activator, 2 parts sulfur and 1.5 parts of accelerators (1 part benzothiazyl disulfide and .5 part diphenylguanidine) and the resultant mixes cured for 15 minutes at 307° F. (60 pounds per square inch steam pressure) and observed. The softeners embodying this invention did not impart any objectionable color to the vulcanizates and red vulcanizates of satisfactory color resulted. The comparative softeners, on the other hand, resulted in vulcanizates with a color from brown to brownish-black; in all cases the comparative softeners imparted an objectionable discoloration to the vulcanizate.

It will be noted the pitch-derived softeners of the invention serve to increase the tensile strength of the vulcanizate, impart desirable stress and elongation characteristics, particularly in that they result in a more elastic vulcanizate as compared with vulcanizates made from the same elastomer under the same conditions and with the same constituents in the same proportions except that a normal pitch softener with a relatively high benzol-insoluble content is employed in lieu of the softener of this invention. Further, the softener of this invention does not cause discoloration of the elastomer mix or the resulting vulcanizate, so that it is admirably suited for use in producing light-colored vulcanizates. Moreover, it is a mild extender, which results in a saving in the amount of elastomer required to produce a desired product. The preferred form of the softener is solid at atmospheric temperature and desirably is supplied in flake form so that it can readily and conveniently be handled, the required amount for any given mix being determined by weight and readily incorporated and dispersed throughout the mix employing conventional rubber handling equipment such as a rubber mill of the roll-type or a Banbury mixer.

The benzol-insoluble content of the materials may be determined, for example, by the method set forth on pages 736 and 820, (Test D5), vol. 10 (1918), of the Journal of Industrial and Engineering Chemistry. The tension data given above are determined by A. S. T. M. Standards on Rubber Products, method D412-41. The term "light-colored" is used to mean red, blue, green, grey, tan, orange and yellow and is intended to exclude black, as well as relatively pure white vulcanizates. The softening points mentioned are all determined by the A. S. T. M. ring and ball method. All percentages are by weight.

Since certain changes may be made without departing from the scope of this invention, it is intended that the above shall be interpreted as illustrative and not in a limiting sense. Thus while the invention is primarily concerned with the production of light-colored vulcanizates, the use of the softeners of this invention in the production of black vulcanizates has been found to impart better tensile and higher elongation characteristics to such vulcanizates than do pitch softeners having higher benzol-insoluble contents. Hence, employing the softeners of this invention it is possible for the rubber compounder to stock and use one softener for the production of both light and dark colored vulcanizates and obtain improved black and light colored vulcanizates.

What is claimed is:

1. A process of making vulcanizates of vulcanizable rubbers, which comprises compounding the rubber with a vulcanizing agent and an extracted bitumen having a softening point within the range of 150° to 250° F. and containing less than 5% benzol-insolubles, said extracted bitumen being obtained by extracting a pitch from the group consisting of water-gas tar pitch, coke-oven tar pitch and gas-house tar pitch with a solvent in which the benzol-insolubles are substantially insoluble to produce the extracted bitumen containing less than 5% benzol-insolubles, and vulcanizing the resultant rubber.

2. A process of making light-colored vulcanizates of vulcanizable rubbers, which comprises compounding the rubber with an extracted bitumen having a softening point within the range of 200° to 220° F. and containing less than 3% benzol-insolubles, said extracted bitumen being obtained by extracting a pitch from the group consisting of water-gas tar pitch, coke-oven tar pitch and gas-house tar pitch with a solvent in which the benzol-insolubles are substantially insoluble to produce the extracted bitumen containing less than 3% benzol-insolubles, and vulcanizing the resultant rubber mix to produce a light-colored vulcanizate.

3. A process of making light-colored vulcanized rubber, which comprises compounding the rubber with a vulcanizing agent and an extracted bitumen having a softening point within the range of 150° to 250° F. and a benzol-insoluble content of less than 5%, said extracted bitumen being obtained by extracting a pitch from the group consisting of water-gas tar pitch, coke-oven tar pitch and gas-house tar pitch with a solvent in which the benzol-insolubles are substantially insoluble to produce the extracted bitumen containing less than 5% benzol-insolubles, and vulcanizing the resultant rubber mix to produce a light-colored vulcanizate.

4. A process of making light-colored vulcanized rubber, which comprises compounding the rubber with a vulcanizing agent and an extracted bitumen having a softening point within the range of 200° to 220° F. and a benzol-insoluble content of less than 3%, said extracted bitumen being obtained by extracting a pitch from the group consisting of water-gas tar pitch, coke-oven tar pitch and gashouse tar pitch with a solvent in which the benzol-insolubles are substantially insoluble to produce the extracted bitumen containing less than 3% benzol-insolubles, and vulcanizing the resultant rubber mix to produce a light-colored vulcanizate.

5. A process of making light-colored butadiene-styrene vulcanizates, which comprises compounding a butadiene-styrene copolymer with a pigment, sulfur, accelerator, and an extracted bitumen having a softening point within the range of 150° to 250° F. and containing less than 5% benzol-insolubles, said extracted bitumen being obtained by extracting a pitch from the group consisting of water-gas tar pitch, coke-oven tar pitch and gas-house tar pitch with a solvent in which the benzol-insolubles are substantially insoluble to produce the extracted bitumen containing less than 5% benzol-insolubles, and vulcanizing the resultant butadiene-styrene mix to produce a light-colored vulcanizate.

6. A process of making light-colored butadiene-styrene copolymer vulcanizates, which comprises compounding a butadiene-styrene copolymer with a vulcanizing agent, pigment and an extracted bitumen having a softening point within the range of 200° to 220° F. and a benzol-insoluble content of less than 3%, said extracted bitumen being obtained by extracting a pitch from the group consisting of water-gas tar pitch, coke-oven tar pitch and gas-house tar pitch with a solvent in which the benzol-insolubles are substantially insoluble to produce the extracted bitumen containing less than 3% benzol-insolubles, and vulcanizing the resultant butadiene-styrene copolymer mix to produce a light-colored vulcanizate.

7. A vulcanizate prepared by vulcanizing a vulcanizable rubber having dispersed therein a vulcanizing agent and an extracted bitumen having a softening point within the range of from 150° to 250° F. and a benzol-insoluble content below 5%, said extracted bitumen being obtained by extracting a pitch from the group consisting of water-gas tar pitch, coke-oven tar pitch and gas-house tar pitch with a solvent in which the benzol-insolubles are substantially insoluble to produce the extracted bitumen containing less than 5% benzol-insolubles.

8. A light-colored vulcanizate prepared by vulcanizing a vulcanizable rubber having dispersed therein a vulcanizing agent and an extracted bitumen having a softening point within the range of from 200° to 220° F. and a benzol-insoluble content below 3%, said extracted bitumen being obtained by extracting a pitch from the group consisting of water-gas tar pitch, coke-oven tar pitch and gas-house tar pitch with a solvent in which the benzol-insolubles are substantially insoluble to produce the extracted bitumen containing less than 3% benzol-insolubles.

9. Vulcanized rubber prepared by vulcanizing rubber having dispersed therein a vulcanizing agent and an extracted bitumen having a softening point of from 150° to 250° F. and containing less than 5% benzol-insolubles, said extracted bitumen being obtained by extracting a pitch from the group consisting of water-gas tar pitch, coke-oven tar pitch and gas-house tar pitch with a solvent in which the benzol-insolubles are substantially insoluble to produce the extracted bitumen containing less than 5% benzol-insolubles.

10. Light-colored vulcanized rubber prepared by vulcanizing rubber having dispersed therein a vulcanizing agent, a pigment imparting the desired color to the rubber and a water-gas tar pitch extract having a softening point of from 200° to 220° F. and a benzol-insoluble content of less than 3%.

11. Light-colored vulcanized butadiene-styrene copolymer prepared by vulcanizing butadiene-styrene copolymer having dispersed therein a vulcanizing agent, and an extracted bitumen having a softening point of from 150° to 250° F. and containing less than 5% benzol-insolubles, said extracted bitumen being obtained by extracting a pitch from the group consisting of water-gas tar pitch, coke-oven tar pitch and gas-house tar pitch with a solvent in which the benzol-insolubles are substantially insoluble to produce the extracted bitumen containing less than 5% benzol-insolubles.

12. Vulcanized butadiene-styrene copolymer prepared by vulcanizing butadiene-styrene copolymer having dispersed therein a vulcanizing agent, a pigment imparting the desired color to the butadiene-styrene copolymer vulcanizate and a water-gas tar pitch extract having a softening point of from 200° to 220° F. and a benzol-insoluble content of less than 3%.

THEODORE A. BULIFANT.

REFERENCES CITED

The following references are of record in the file of this patent:

UNITED STATES PATENTS

| Number | Name | Date |
| --- | --- | --- |
| 1,355,099 | Weiss | Oct. 5, 1920 |
| 1,708,602 | Black et al. | Apr. 9, 1929 |
| 1,884,240 | Rhodes et al. | Oct. 25, 1932 |
| 2,304,777 | Bulifant | Dec. 15, 1942 |
| 2,340,847 | Parkes | Feb. 1, 1944 |

FOREIGN PATENTS

| Number | Country | Date |
| --- | --- | --- |
| 134,528 | Great Britain | Apr. 14, 1921 |